Figure 1:
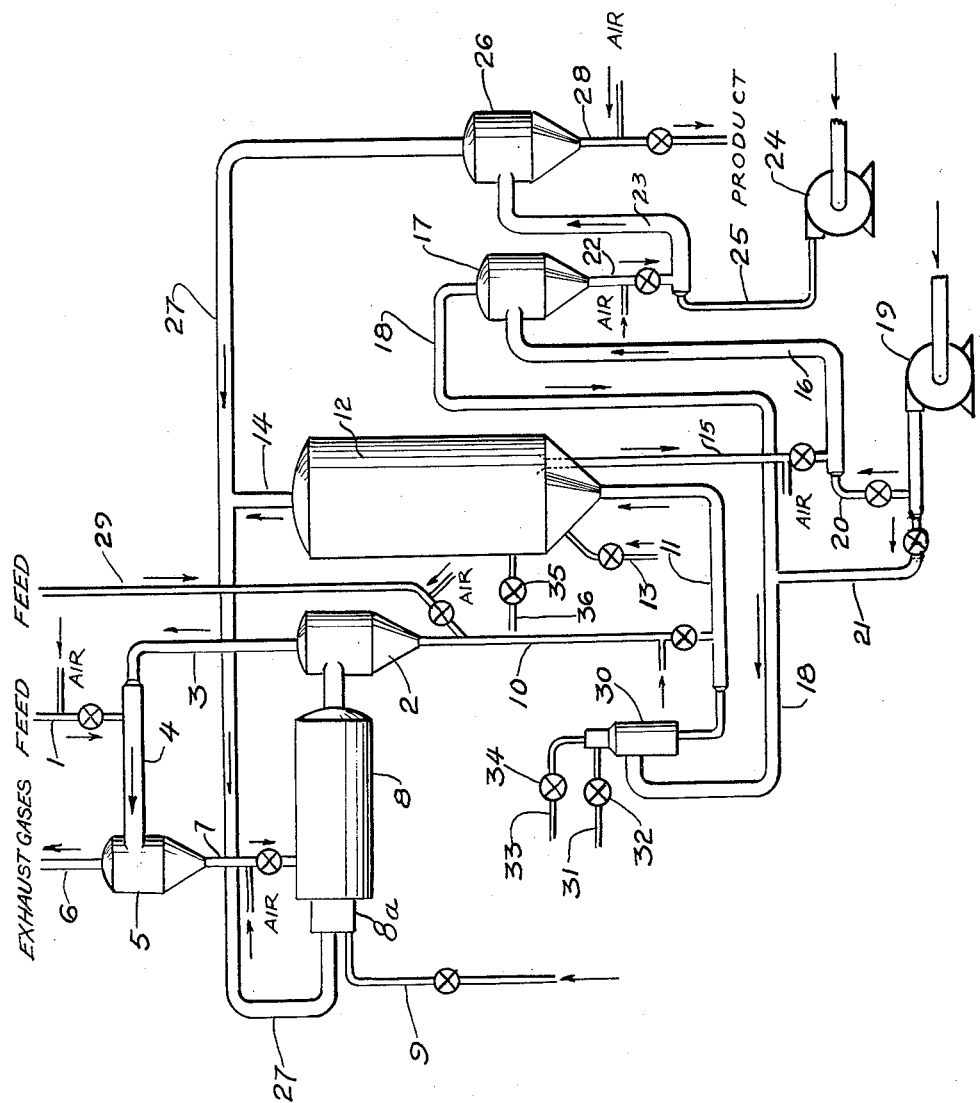

Dec. 19, 1961 R. PYZEL 3,013,786
HYDRAULIC CEMENT PROCESS
Filed July 9, 1954 2 Sheets-Sheet 1

INVENTOR
Robert Pyzel
BY
Moses, Nolte, Crews & Berry
ATTORNEY

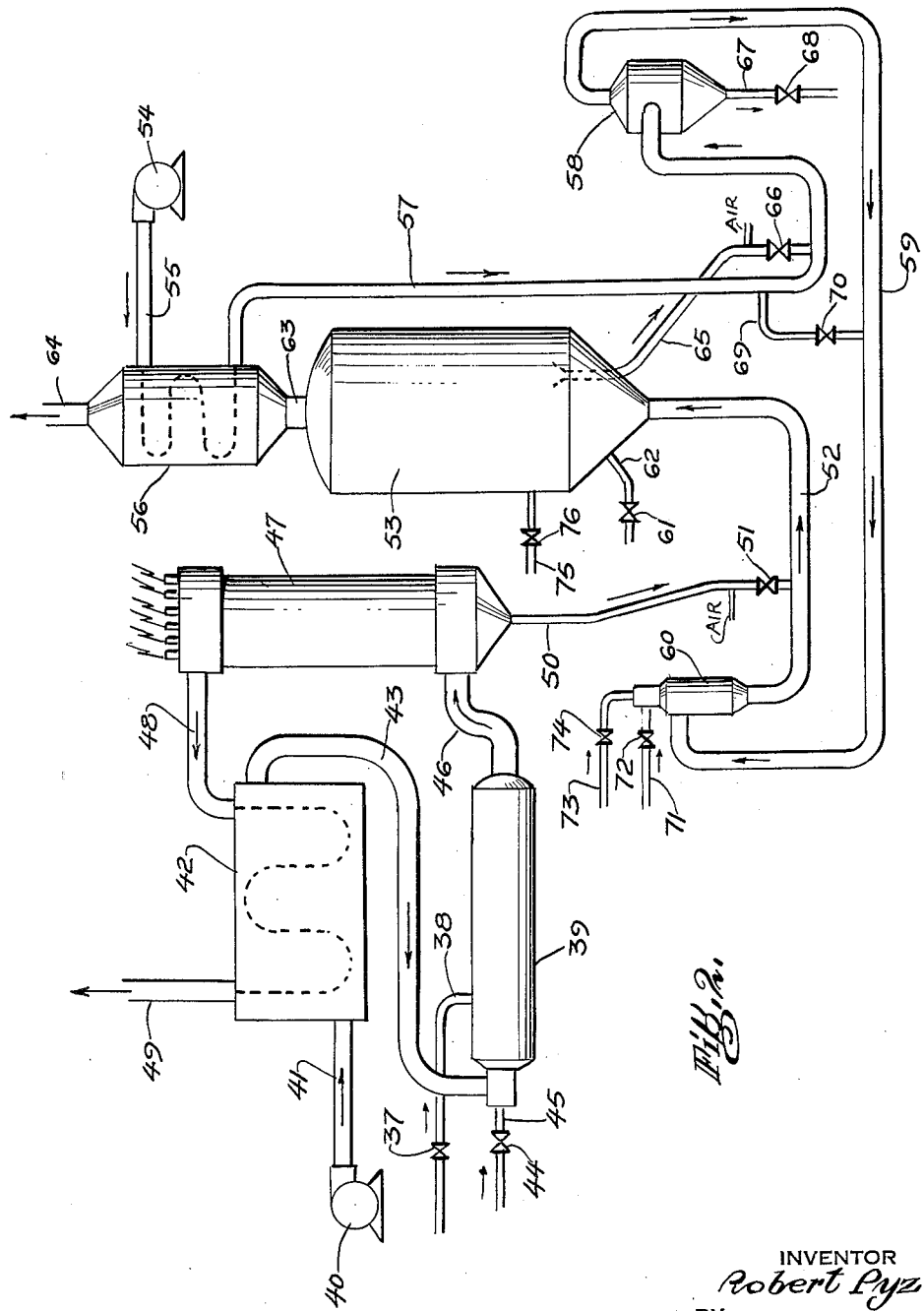

United States Patent Office 3,013,786
Patented Dec. 19, 1961

3,013,786
HYDRAULIC CEMENT PROCESS
Robert Pyzel, New York, N.Y., assignor, by mesne assignments, to Union Commerce Bank, a corporation of Ohio, trustee
Filed July 9, 1954, Ser. No. 442,356
10 Claims. (Cl. 263—53)

My invention relates to improvements in the art of manufacturing cements. Among the particular objectives of my invention are (1) to provide the means for manufacturing hydraulic cements more economically and (2) to provide the means for producing cements of better quality.

Cements are manufactured from raw materials consisting of calcium carbonate, and the like, and silica, alumina and iron oxides, and the like. To convert these materials into cement requires that the carbonates be converted to the corresponding oxides by calcining to drive off carbon dioxide and that the calcium oxides so obtained are reacted with the silica, alumina and iron oxide materials to form compounds consisting of combinations of all these oxides. The latter reaction, consisting of a number of reactions, is generally referred to in the industry as "clinkering," this term being descriptive of the appearance of the cement product produced by the rotary kilns which are at present almost exclusively used for the manufacture of commercial cements.

One of the features of my invention is that the preheating of the feed materials and calcining of carbonation contained in these materials is accomplished by charging the feed materials in finely powdered form into high temperature combustion gases to be heated by and carried in suspension in such combustion gases, until the desired amount of preheating and calcination has been accomplished.

Another feature of my invention is that the cement forming reactions (in which calcium oxide is combined with the other oxides) takes place in a mass of fluidized solid particles which is established in a cement forming reaction zone and is maintained at cement forming reaction temperatures, and in which a controlled and limited amount of reaction occurs relative to the total mass of fluidized materials present in said reaction zone, and in which the formation of "clinkers" or large aggregates of reactant materials is avoided while the reacting materials are nevertheless permitted to "flux" in order to form the desired cement product.

Another feature of my invention is that the cement forming reactions may be carried out at much longer time factors and at more uniform, and if desired, higher temperatures than those now possible in the kilns used in the cement industry.

Another feature of my invention is that alkali materials which may be present in the feed materials charged to the process, are removed from the cement forming reaction zone as sodium and potassium oxide vapors, and may be discharged from the process without contacting the feed materials. Thus the build-up of an alkali recycle within the process (such as occurs in rotary kilns and other process now used in the cement industry, or described in the literature) is prevented, and the alkali concentration in the cement forming reaction zone is kept at the minimum possible depending only on the original alkali content of the feed materials. Because of this mode of operation the cement product produced by my process contains only a trace of alkalies, if any.

In order to fully set forth the operation of my invention it will be necessary to describe in some detail the progress of the reactions which, in combination, make up the "clinkering" reaction.

The reactions which take place when the oxides combine to form the cement product are quite complex, and while it is not necessary to develop all the possible ramifications which are known regarding these reactions, it is necessary to consider some of the major aspects of this complex system of interrelated reactions in order to fully understand some of the important advantages of my invention. The following discussion is therefore presented for illustrative purposes only and is not meant to be all inclusive, and it limits itself to considering only the reactions between calcium oxide, silica and alumina, leaving out other materials which are usually, but not necessarily, present such as magnesium oxide and iron oxides.

The net effect of the overall reaction is to combine calcium oxide with silica and with alumina to form the compounds known as dicalcium silicate, tricalcium silicate and tricalcium aluminate, as expressed in the following formulas:

(1)      $2CaO+SiO_2 \rightarrow 2CaO.SiO_2$
(2)      $3CaO+SiO_2 \rightarrow 3CaO.SiO_2$
(3)      $3CaO+Al_2O_3 \rightarrow 3CaO.Al_2O_3$

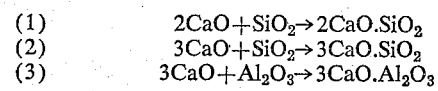

These reactions, however, do not all proceed directly as shown by these formulas. When the starting oxides are heated to the required temperatures, the first compounds form as the dicalcium silicate (in accordance with Formula 1 above) and an intermediate compound of calcium oxide and alumina with the composition $5CaO.3Al_2O_3$ which contains relatively less calcium oxide than the ultimate tricalcium aluminate.

The dicalcium silicate then continues to react with additional calcium oxide to form tricalcium silicate, while the intermediate calcium aluminate compound also reacts with additional calcium oxide to form tricalcium aluminate, according to the following formulas:

(4)      $CaO+2CaO.SiO_2 \rightarrow 3CaO.SiO_2$
(5)      $4CaO+5CaO.3Al_2O_3 \rightarrow 3(3CaO.Al_2O_3)$

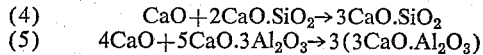

In the overall reaction consisting of this combination of reactions the intermediate compound $5CaO.3Al_2O_3$ is strictly a transitory material only which is formed by alumina reacting with calcium oxide and which disappears by further reacting with additional calcium oxide. It plays an unusual role in the progress of the overall reaction because it forms a eutectic mixture with the di- and tricalcium silicates which readily melts at the temperatures at which the overall reaction takes place. This melting of the eutectic mixture creates a flux which is helpful to the progress of the overall reaction, but on the other hand it can be the cause of excessive melting of the reacting materials.

It should be noted that the final product materials of this overall reaction are in themselves stable under the reaction temperatures, in that they will neither melt nor dissociate.

It is a feature of my invention that the overall reaction is carried out in the presence of large quantities of finished stable reaction products and is made to proceed primarily on the surfaces of particles of such stable products. As a result it becomes possible to carry out the overall reaction with a maximum amount of fluxing of the reacting materials without fear of excessive melting of the total mass of material in the reaction zone. The manner of accomplishing this will be apparent from the further description of my invention.

Another advantage of my invention is that the calcining of the carbonates is accomplished by charging the carbonates in powdered form directly into high temperature combustion gases in which the carbonate particles are rapidly heated to the desired temperature and the reaction heat to drive off the carbon dioxide is supplied.

In the operation of my invention it is not essential that the carbonates are wholly converted to the corresponding oxides in the calcining combustion space, but a substantial proportion of the carbonates must be converted. Any remaining unconverted carbonates will automatically be converted in the subsequent cement forming reaction zone under the reaction conditions prevailing in this zone.

In accordance with my improved process the feed materials are first ground to powder in conventional equipment, to a particle size smaller than the particle size of the product material discharged from the process by the means and procedures referred to below; for example, if the product material is selected and controlled to be particles larger than 200 microns diameter, then the feed materials should be reduced to particles smaller than, for instance, 100 microns diameter, which would provide a difference of 100 microns between the diameters of the largest particles in the feed materials and the smallest particles in the product material.

This feed powder is then subjected to a calcining step which consists of charging it into an enclosed combustion space in which the power is carried in suspension in and is heated by combustion gases generated in this space. Fuel and air are burned in this combustion space to obtain the requisite calcining temperatures in the range of 1400 to 1900 degrees F. and to supply the necessary reaction heat for the endothermic calcining reaction. Thereafter the calcined powder is separated from the combustion gases and is charged into the cement forming reaction zone in which a mass of particles of cement product materials is maintained in a densely suspended fluidized state, this state being maintained by the passage of air upwardly through the particle mass at the proper velocity. The fluidized mass is maintained at the desired reaction temperatures in the range of 2300 to 2900 degrees F. by charging fuel into the fluidized mass which generates the required heat (together with the heat generated by the exothermic cement forming reactions) by combustion with the air passing upwardly through the mass.

The calcined powder charged into the cement forming reaction zone will be rapidly dispersed throughout the fluidized mass by reason of its high turbulence characteristics, and reactions between the oxides will be induced by the temperatures prevailing in this zone. Such reactions will take place primarily on, and will also involve, the surfaces of the particles of product material making up the bulk of the fluidized mass. The progress of the reactions will in this manner effect a continual growing of the size of the particles constituting the fluidized mass as layer upon layer of new product material is created upon the already existing particles of product material.

Some new particles of product material will also continuously be formed by direct reaction between the oxides charged without being affixed to already existing particles of product material, and much new particles may thereafter become the nuclei for further reaction on their surfaces.

A stream of fluidised particles is withdrawn from the cement forming reaction zone and is subjected to a separating step wherein the coarser particles, for example, those larger than 200 microns diameter, are separated from the finer particles. These coarser particles are discharged from the process as its final product. The finer particles are returned to the fluidized mass in the cement forming reaction zone to be subjected to further reaction as outlined above. By this arrangement I provide the means for producing as product of the process only the larger product particles, while at the same time, by returning the finer particles, the fluidized mass in the cement forming reaction zone is maintained with a predetermined average particle size distribution for the most effective operation of the fluidized mass while permitting the continual growing of particles as outlined above. Furthermore, by these means I insure that the particles withdrawn as product from the process are homogeneously reacted and "fluxed" throughout and in harmony with the selected analysis of the feed materials to the process.

Since fluidized material withdrawn from the reaction zone will contain some unreacted material, inasmuch as unreacted material is dispersed throughout the fluidized mass, it follows that if only the production of the process, without selective recycling, were withdrawn from the reaction zone then the product of the process would contain such unreacted material. But with the selective withdrawal arrangement herein disclosed all unreacted material will be returned to and retained in the fluidized mass in the reaction zone since it is finer than the coarser product particles which alone are discharged from the process. In other words, the selective withdrawal provides that fluidized material is not discharged from the process until it has reacted into particles which are larger in size than the particles of the unreacted feed materials introduced into the reaction zone, and therefore only reaction product can be withdrawn from the process.

My process may also be operated to produce a cement product which is free of alkalies, for the reasons and by the procedure set out in the following two paragraphs.

The alkali materials which may be present in the feed materials charged to the process are converted to sodium and potassium oxide in the cement forming reaction zone, and these oxides will be vaporized at the operating temperatures prevailing in this zone. Such oxide vapors are carried from the fluidized mass and leave this reaction zone in the discharging gas stream. But when this gas stream is brought in direct contact with the feed materials at the lower temperatures prevailing in the calcining section, these oxide vapors condense and solidify to a fine alkali dust or powder, and a part of this dust or powder will be returned to the cement forming reaction zone with the calcined feed materials. In this manner an alkali recycle within the process is set up whereby the alkali concentration in the cement forming reaction zone is increased until an equilibrium is established with some alkalies leaving the process in the cement product and some in the exhaust gases. (Such an alkali recycle equilibrium inevitably occurs in the rotary kilns and other processes now used in the cement industry.) When my process is operated in this manner the cement product will contain some alkalies if alkalies are present in the feed materials.

However, in my process it is possible to prevent the build-up of an internal alkali recycle, since the calcination reactions and the cement forming reactions are carried out in separate and distinct sections. Consequently, when the available feed materials contain an excessive amount of alkalies, or when it is desired to produce a cement product free of alkalies, my process may be operated so that the alkali oxide vapor containing gases which discharge from the cement forming reaction zone are not brought in contact with the feed materials. Thus condensation of such alkali oxide vapors in the feed materials is prevented, and the undesirable build-up of an alkali recycle within the process is avoided. In operating my process in this manner, the concentration of alkalies in the cement forming fluidized mass is held to the minimum possible depending only on the original alkali content of the feed materials, and the cement product produced contains only a trace of alkalies, if any.

All the above and other objects of my invention will be more fully understood on reading the following description of the process with reference to the accompanying diagrammatic drawings showing two types of apparatus suitable for carrying out my improved process.

FIG. 1 illustrates the operation of my process when charging feed materials of low alkali content or when it is not essential to produce an alkali free product, while FIG. 2 illustrates the operation of the process to produce an alkali-free product. It will be apparent to those skilled in the art that certain equipment alternative to that shown on the drawings may be employed without departing from the essence of my invention, and the apparatuses shown therefor constitute preferred forms suitable for the purpose but not intended as a limitation upon the full scope of my invention.

The invention will be further described in connection with the accompanying drawings in which:

FIG. 1 is a diagrammatic view of one form of apparatus in which the method may be practiced, and FIG. 2 is a diagrammatic view of another form of apparatus in which the invention may be practiced.

Referring to FIG. 1, the powdered feed materials are introduced through pipe 1 and are commingled with the hot gases which are discharged from separator 2 through pipe 3. The mixture of powder and gases flows through pipe 4 in which heat exchange between the powder and gases takes place, and the mixture is charged into separator 5 wherein the powder is separated from the gases. The gases are discharged from the process through pipe 6. The preheated feed powder is discharged from separator 5 through standpipe 7 and charged into the calcining furnace 8 which may consist of an elongated vessel provided with an internal refractory lining and equipped with a burner 8a at one end. Combustion takes place in this furnace by burning fuel supplied through pipe 9 and air supplied through pipe 27 in burner 8a. In the calcining furnace 8 the feed powder is heated to reaction temperatures, i.e. 1400–1900° F. and the carbonate components are calcined by driving off carbon dioxide gases generated by the calcining reaction, flow from calcining furnace 8 into separator 2 in which the powder is separated from the gases. The gases are discharged from separator 2 through pipe 3 to commingle with the feed powder, as stated hereinbefore.

The separators referred to hereinbefore and subsequently may be cyclone separators, electrical precipitators or any other known type, or any combinations thereof.

The calcinated powder is discharged from separator 2 through standpipe 10 and is charged into the air stream which also carries recycle particles and which flows through pipe 11 into the bottom of reactor 12. Reactor 12 may be a cylindrical vessel placed in a vertical position and provided with an internal refractory lining. The calcined powder entering reactor 12 is rapidly dispersed throughout the high temperature fluidized mass maintained in reactor 12 and the cement forming reactions take place, as previously described. Fuel is supplied to reactor 12 through pipe 13 and combustion takes place throughout the fluidized mass by burning of the fuel with the air passing upwardly through the mass, thereby maintaining the reaction temperatures in the range of 2300 to 2900° F. Combustion gases issuing from the fluidized mass are discharged from the top of reactor 12 through pipe 14 which connects with the air pipe 27.

A stream of product and recycle particles is discharged from reactor 12 through standpipe 15 and is charged into air supply pipe 16. Heat exchange takes place in pipe 16. The mixture of air, product particles and recycle particles is charged into separator 17 wherein the larger product particles are separated from the air and the smaller recycle particles. The stream of air, carrying the smaller recycle particles, is discharged from separator 17 through pipe 18 and flows through auxiliary burner 30 into pipe 11. Air is supplied to pipe 16 by blower 19 through pipe 20. A part of the air supplied by blower 19 may be charged directly into pipe 18 through pipe 21, instead of flowing through pipes 20 and 16 and through separator 17. The air supplied by blower 19, which constitutes the air charged into reactor 12, may therefore be charged altogether through separator 17, or a part of the air supply may be made to by-pass separator 17, and this provides a control by which the relative separation of larger particles from smaller particles in separator 17 may be varied. Such control, together with adjustments in the rate of flow of fluidized particles through standpipe 15 into pipe 16, provide means for varying the rate and particle size of the recycle of smaller particles to reactor 12 and of the particle size of the larger particles discharged from the process as final product, and thereby provides a degree of control over the particle size distribution in the fluidized mass in reactor 12.

The larger product particles separated in separator 17 are discharged through standpipe 22 and are charged into air supply pipe 23. Air is supplied to pipe 23 by blower 24 through pipe 25. Heat exchange takes place in pipe 23 and mixture of air and product particles is charged into separator 26 wherein the product particles are separated from the preheated air. The preheated air stream is discharged from separator 26 through pipe 27 and is charged, together with the high temperature gases from reactor 12 which enter pipe 27 through pipe 14, into the calcining furnace 8. The product particles separated in separator 26 are discharged from the process through standpipe 28.

If the source of the feed materials makes it possible to prepare the carbonate feed powder separate from the silica, alumina and iron oxides powder, it may be preferred to charge only the carbonate feed powder to the calcining furnace 8 through pipe 1 and 4, separator 5 and standpipe 7, while charging the silica, alumina and iron oxides powder directly into standpipe 10 through pipe 29.

The powdered and small particles materials being conveyed through standpipes 1, 7, 10, 15, 22, 28 and 29 may be kept in a free flowing static head condition by charging an aerating gas, such as air, into these standpipes just above the flow controlling valves as indicated on the drawing by small pipes with the designation "air." This aerating procedure is conventional practice in the art of handling fluidized powdered or granular solids.

The pressure heads required to force the flow of air and gases through the various parts of the apparatus are obtained by means of blowers 19 and 24. The necessary pressure heads required to force the flow of solids through the various parts of the apparatus are obtained by the static pressure heads in the standpipes, particularly in standpipes 10 and 15 which must be of sufficient height to obtain the desired flow. Where necessary, because of the high temperatures, the equipment is internally lined with a suitable refractory lining, and the apparatus is generally well insulated against radiation losses.

The process may be placed in operation by charging air and fuel into combustion furnace 8, lighting the fire, and bringing this furnace up to temperature. The air will be supplied by blowers 24 and 19; the air from blower 24 flowing through pipes 25 and 23, separator 26 and pipe 27, while the air from blower 19 will flow through pipes 20 and 16, separator 17, pipe 18, auxiliary burner 30, pipe 11, reactor 12, pipe 14 and pipe 27. The auxiliary burner 30 is placed in operation by supplying air and fuel to it through pipe 31 with valve 32 and pipe 33 with valve 34 respectively. The burner is ignited and by this operation a mixture of combustion gases and heated air is caused to flow through reactor 12, thereby raising the temperature of the reactor.

Relatively coarse product particles are charged into reactor 12 through pipe 36 with valve 35, to establish the initial fluidized mass of product particles in reactor 12. When the temperature of this fluidized mass has been brought up to about 1000 degrees F., fuel may be charged directly into the fluidized mass through pipe 13, and the fluidized mass may be brought up to reaction temperatures in excess of 2000 degrees F. The fire in auxiliary burner 30 may be discontinued by closing valves 32 and 34.

When the combustion furnace 8 and reactor 12 are at operating temperatures, the flow of feed powder through pipe 1, and pipe 29 if desired, may be started, followed by starting the flow of material through pipe 15, and the withdrawal of product particles through pipes 22 and 28. The process is now on stream and may be lined out to the desired operating conditions of flow, temperature and capacity.

Referring now to FIG. 2, the powdered feed materials are introduced through valve 37 and pipe 38 into calcining furnace 39, which may consist of an elongated vessel provided with an internal refractory lining and equipped with a burner at one end. Air is supplied to calcining furnace 39 by means of blower 40, the air flowing from blower 40 through pipe 41, indirect heat exchanger 42 and pipe 43. Fuel is supplied to calcining furnace 39 through valve 44 and pipe 45. Combustion of fuel and air takes place in calcining furnace 39, and the powdered feed materials are charged into the combustion gases so generated and are heated to calcining temperatures while carried in suspension in the gases.

The partially or completely calcined feed powder is carried out of the calcining furnace 39 still in suspension in the combustion gases which flow through pipe 46 into separator 47, in which the powdered particles are separated from the gases. Separator 47 may be an electrical precipitator or a cyclone separator, or any other type of separator suitable for the purpose. The gases leave separator 47 through pipe 48, pass through heat exchanger 42, and are discharged through stack 49.

The calcined feed powder flows through standpipe 50 and control valve 51 into pipe 52, and is carried by the air flowing through pipe 52 into reactor 53. Reactor 53 may be a cylindrical vessel placed in a vertical position and provided with an internal refractory lining. The calcined powder entering reactor 53 is rapidly dispersed throughout the high temperature fluidized mass maintained in this reactor, and the cement forming reactions take place as previously described.

Air is supplied to reactor 53 by means of blower 54, flowing from the blower first through pipe 55, then through indirect heat exchanger 56, then through pipe 57, then through separator 58, then through pipe 59, then through auxiliary burner 60, and then through pipe 52. Fuel is supplied to reactor 53 through valve 61 and pipe 62. The combustion gases and any other gases or alkali vapors issuing from the fluidized mass flow from reactor 53 through pipe 63, through heat exchanger 56, and are discharged through stack 64.

A stream of fluidized particles is withdrawn from reactor 53 through standpipe 65 and flow control device 66, and is charged into the air stream flowing through pipe 57 into separator 58. In separator 58 the larger particles are separated from the air and the smaller particles. The air stream, carrying the smaller particles in suspension, flows on through pipe 59, auxiliary burner 60 and pipe 52, as before mentioned, and thus returns the smaller particles to the fluidized mass in reactor 53. The larger particles are discharged from separator 58 through pipe 67 and valve 68.

A part of the air flowing through pipe 57 may be made to flow through pipe 69 and valve 70 directly into pipe 59, thus by-passing separator 58, and by this arrangement, that is, by varying the amount of air flowing through separator 58, the degree of separation of larger from smaller particles in separator 58 may be controlled to obtain the most suitable operation of the process.

The powdered and small particle materials being conveyed through standpipes 50 and 65 may be kept in a free flowing static head condition by charging an aerating gas, such as air, into these standpipes just above the flow control valves or device, as indicated on the drawing by small pipes with the designation "air." Where necessary, because of high temperatures, the equipment is internally lined with a suitable refractory lining, and the apparatus is generally well insulated against radiation losses.

The process may be placed in operation by charging air and fuel into combustion furnace 39, lighting the fire, and bringing this furnace up to temperature. The air will be supplied by blower 40, flowing from this blower through pipe 41, heat exchanger 42, and pipe 43. Meanwhile air may be charged through reactor 53 by means of blower 54, flowing from this blower through pipe 55, heat exchanger 56, pipe 57, separator 58, pipe 59, auxiliary burner 60 and pipe 52. The auxiliary burner is ignited and by this operation a mixture of combustion gases and heated air is caused to flow through reactor 53, thereby raising the temperature of the reactor.

Relatively coarse product particles are charged into reactor 53 through pipe 75 with valve 76, to establish the initial fluidized mass of product particles in reactor 53. When the temperature of this mass has been brought up to about 1000 degrees F., fuel may be charged directly into the fluidized mass through pipe 62, and the fluidized mass may be brought up to reaction temperatures in excess of 2000 degrees F. The fire in auxiliary burner 60 may be discontinued by closing valves 72 and 74.

When combustion furnace 39 and reactor 53 are at operating temperatures, the flow of feed powder through pipe 38 may be started, followed by starting the flow of material through standpipes 50 and 65, and the withdrawal of product particles through pipe 67. The process is now on stream and may be lined out to the desired operating conditions of flow, temperatures and capacity.

This application is a continuation-in-part of my prior application Serial No. 264,144, filed December 29, 1951, now abandoned.

Having thus described my invention, what I claim is:

1. In a process for producing hydraulic cements which comprises maintaining in a reaction zone a fluidized mass of finely divided particles consisting principally of reacted materials of a chemical composition similar to the composition of the product produced by the process, maintaining the fluidized mass by charging an air stream into the bottom of the reaction zone and forcing the air to pass upwardly through the fluidized mass, charging fuel into the fluidized mass which by combustion with the air maintains the mass at the required reaction temperatures and discharging the combustion gases so generated from the top of the reaction zone above the level of the fluidized mass, the improvement which comprises passing said air stream prior to charging it into the bottom of the reaction zone first through a separating zone adapted to separate solid particles from the air stream, charging finely divided solids including oxides of calcium, silicon, aluminum, into said air stream before it enters the bottom of the reaction zone but after it has passed through said separating zone whereby such oxides are carried into the fluidized mass by the air stream, withdrawing a stream of particles from the fluidized mass and charging such particles into the air stream before it passes through said separating zone, separating only the coarser particles in said separating zone and discharging such coarser particles from the process while retaining the finer particles in the air stream leaving said separating zone to be carried by said air stream into the fluidized mass.

2. A method for the production of hydraulic cement which comprises establishing and maintaining a mass of relatively coarse finished cement product particles in a fluidized state in a reaction zone by upward flow of air through said mass, charging fuel into said mass which by combustion with said air generates the heat necessary to maintain said mass at reaction temperature, charging relatively fine particles of cement forming raw materials into said fluidized mass to permit reaction to take place, within said fluidized mass, between said fine raw material particles and on said coarse product particles, withdrawing a part of the fluidized mass and passing said withdrawn part through a controlled separating zone to separate all of the fine particles from the coarse particles of said withdrawn part, recharging said finer particles into the fluidized mass and discharging said coarser particles as product.

3. A method for the production of hydraulic cement as set forth in claim 2 in which the gases issuing from the fluidized mass are passed into contact with the fine particles of cement-forming raw materials while said particles are in suspension and prior to their introduction into the fluidized mass.

4. The method of producing hydraulic cement as set forth in claim 2, in which the cement-forming material consists of carbonates and oxides, said material is passed through a calcining zone to subject the carbonates to calcination before they are charged into said fluidized mass, and the gases issuing from the fluidized mass are discharged without further direct contact between said gases and any of the materials being processed.

5. The method of producing hydraulic cement as set forth in claim 2, in which the cement-forming material consists of carbonates and oxides, the carbonates are charged, in powdered form, into a combustion zone to be heated and carried in suspension in the combustion gases generated in said combustion zone and to subject said carbonates to calcination, and the calcined material is separated from the combustion gases and the liberated carbon dioxide before the material is charged into said fluidized mass.

6. A process for the production of hydraulic cement from relatively fine, raw, uncalcined, carbonate-containing, cement-forming materials which comprises establishing a bed of relatively coarse fluidized particles predominantly of a chemical composition substantially the same as the hydraulic cement to be produced, maintaining said bed in a fluidized state by charging gas into the bottom portion thereof, calcining at least the major portion of the carbonate content of the raw cement-forming materials, charging the raw cement-forming materials, including the calcined product, in powdered form into said bed of fluidized particles, raising the temperature of said raw cement-forming particles in the bed to the cement-forming reaction temperature, whereby the raw cement-forming materials react in said bed to form hydraulic cement, discharging gas from above the reaction zone and the fluidized bed, discharging a portion of the fluidized bed, passing the discharged portion through a controlled separating zone, separating the finer particles from the coarser particles in said separating zone, recharging the separated finer particles into the fluidized mass, and discharging the coarser particles as the final product of the reaction.

7. A process for the production of hydraulic cement as set forth in claim 6 in which the calcination is conducted in a combustion chamber.

8. A process for the production of hydraulic cement as set forth in claim 7 in which at least a part of the gases discharged from the reaction zone are introduced into the calcining zone.

9. A process for the production of hydraulic cement as set forth in claim 6 in which the gas introduced into the bottom of the bed is air and fuel is charged into the fluidized bed for combustion with said air within the bed, and in which the relative amounts of fuel and air introduced into the bed are sufficient, on combustion, to raise the temperature of the cement-forming materials to the cement-forming reaction temperature.

10. A method for the production of hydraulic cement which comprises establishing and maintaining a mass of relatively coarse finished cement product particles in a fluidized state in a reaction zone by upward flow of a gas through said mass, charging relatively fine particles of raw cement-forming materials into said fluidized mass, raising the temperature of said raw cement-forming materials within said fluidized mass to the cement-forming reaction temperature, whereby said raw cement-forming materials react within said bed to form cement, passing a part of said fluidized mass through a separating zone, separating the fine particles from the coarser particles in said separating zone, re-charging the separated finer particles into the fluidized mass, and discharging the coarser particles as the final product of the reaction.

References Cited in the file of this patent
UNITED STATES PATENTS

| | | |
|---|---|---|
| 692,257 | Eldred | Feb. 4, 1902 |
| 1,158,371 | Carnie | Oct. 26, 1915 |
| 2,214,345 | Pike | Sept. 10, 1940 |
| 2,409,707 | Roetheli | Oct. 22, 1946 |
| 2,498,710 | Roetheli | Feb. 28, 1950 |
| 2,529,366 | Bauer | Nov. 7, 1950 |
| 2,548,642 | White | Apr. 10, 1951 |
| 2,650,084 | White | Aug. 25, 1953 |
| 2,738,182 | Thompson | Mar. 13, 1956 |